(12) United States Patent
Gardner et al.

(10) Patent No.: US 11,364,724 B2
(45) Date of Patent: Jun. 21, 2022

(54) LOGIC CIRCUITRY PACKAGE

(71) Applicant: HEWLETT-PACKARD DEVELOPMENT COMPANY, L.P., Spring, TX (US)

(72) Inventors: James Michael Gardner, Corvallis, OR (US); David B. Novak, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 43 days.

(21) Appl. No.: 16/768,628

(22) PCT Filed: Oct. 25, 2019

(86) PCT No.: PCT/US2019/058172
§ 371 (c)(1),
(2) Date: May 29, 2020

(87) PCT Pub. No.: WO2020/117401
PCT Pub. Date: Jun. 11, 2020

(65) Prior Publication Data
US 2021/0221143 A1 Jul. 22, 2021

Related U.S. Application Data

(63) Continuation-in-part of application No. PCT/US2019/026133, filed on Apr. 5, 2019, which is
(Continued)

(51) Int. Cl.
*B41J 2/175* (2006.01)
*B41J 2/045* (2006.01)
(Continued)

(52) U.S. Cl.
CPC ......... *B41J 2/17546* (2013.01); *B29C 64/259* (2017.08); *B33Y 30/00* (2014.12);
(Continued)

(58) Field of Classification Search
CPC .. B41J 2/17546; B41J 2/04508; B41J 2/0458; B41J 2/04541; B41J 2/04586;
(Continued)

(56) References Cited

U.S. PATENT DOCUMENTS 3,109,125 A 10/1963 Wachowiak
3,553,483 A 1/1971 Jarvis
(Continued)

FOREIGN PATENT DOCUMENTS

AU 2014202104 A1 5/2014
CA 2507422 A1 1/2002
(Continued)

OTHER PUBLICATIONS

Arnostech, "Thermal Inkjet Printers," http://www.arnostech.com/machines/coding-systems/thermal-inkjet-printers/, retrieved Jul. 1, 2019, 3 pgs.
(Continued)

*Primary Examiner* — Kristal Feggins
*Assistant Examiner* — Alexander D Shenderov
(74) *Attorney, Agent, or Firm* — Dicke Billig & Czaja PLLC

(57) ABSTRACT

A logic circuitry package for a replaceable print apparatus component includes an interface to communicate with a print apparatus logic circuit and at least one logic circuit including a memory storing a reference parameter. The at least one logic circuit is configured to receive, via the interface, a first request sent to a first address to read the reference parameter; and transmit, via the interface, the reference parameter in response to the first request. The at least one logic circuit is configured to receive, via the interface, a second request sent to a second address to implement a task; and implement the task to output a digital
(Continued)

value via the interface in response to the second request. The reference parameter corresponds to the digital value.

26 Claims, 11 Drawing Sheets

Related U.S. Application Data a continuation-in-part of application No. PCT/US2019/026152, filed on Apr. 5, 2019, which is a continuation-in-part of application No. PCT/US2019/026161, filed on Apr. 5, 2019, which is a continuation-in-part of application No. PCT/US2018/063631, filed on Dec. 3, 2018.

(51) Int. Cl.

| | | |
|---|---|---|
| *G06F 13/42* | (2006.01) | |
| *G06F 21/44* | (2013.01) | |
| *G06F 1/12* | (2006.01) | |
| *G06F 1/08* | (2006.01) | |
| *H03K 19/0175* | (2006.01) | |
| *B33Y 30/00* | (2015.01) | |
| *B29C 64/259* | (2017.01) | |
| *G06F 3/12* | (2006.01) | |
| *G01F 23/24* | (2006.01) | |
| *G01F 23/80* | (2022.01) | |

(52) U.S. Cl.
CPC ......... *B41J 2/0458* (2013.01); *B41J 2/04508* (2013.01); *B41J 2/04541* (2013.01); *B41J 2/04546* (2013.01); *B41J 2/04563* (2013.01); *B41J 2/04586* (2013.01); *B41J 2/1753* (2013.01); *B41J 2/17513* (2013.01); *B41J 2/17526* (2013.01); *B41J 2/17566* (2013.01); *G01F 23/247* (2013.01); *G01F 23/802* (2022.01); *G01F 23/804* (2022.01); *G06F 1/08* (2013.01); *G06F 1/12* (2013.01); *G06F 3/121* (2013.01); *G06F 13/4291* (2013.01); *G06F 21/44* (2013.01); *H03K 19/017509* (2013.01); *G06F 13/42* (2013.01); *G06F 2213/0016* (2013.01)

(58) Field of Classification Search
CPC  B41J 2/17526; B41J 2/04563; B41J 2/04546; B41J 2/17566; B41J 2002/17586; B41J 2/17513; B41J 2/1753; B41J 2/17553; B41J 2/17556; G06F 3/121; G06F 1/12; G06F 1/08; G06F 13/4291; G06F 21/44; G06F 2213/0016; G06F 13/42; G06F 21/60; G06F 21/608; G01F 23/0076; G01F 25/0061; G01F 23/247; H03K 19/017509; B33Y 30/00; B29C 64/259
USPC .......................................................... 347/86
See application file for complete search history.

(56) References Cited

U.S. PATENT DOCUMENTS

| | | |
|---|---|---|
| 3,614,576 A | 10/1971 | Raphael |
| 4,074,284 A | 2/1978 | Dexter et al. |
| 4,503,441 A | 3/1985 | Tamukai |
| 4,506,276 A | 3/1985 | Kyser et al. |
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A | 9/1992 | Baughman |
| 5,329,254 A | 7/1994 | Takano |
| 5,438,351 A | 8/1995 | Trenchard et al. |
| 5,471,176 A | 11/1995 | James et al. |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele |
| 6,402,299 B1 | 6/2002 | DeMeerleer |
| 6,412,901 B2 | 7/2002 | Su et al. |
| 6,431,670 B1 | 8/2002 | Schantz et al. |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson, Jr. et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carson et al. |
| 6,969,137 B2 | 11/2005 | Maeda |
| 7,039,734 B2 | 5/2006 | Sun et al. |
| 7,077,506 B2 | 7/2006 | Chen |
| 7,171,323 B2 | 1/2007 | Shipton et al. |
| 7,240,130 B2 | 7/2007 | Larson |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Lexmark |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |
| 8,331,581 B2 | 12/2012 | Pennock |
| 8,348,377 B2 | 1/2013 | Asauchi |
| 8,350,628 B1 | 1/2013 | George et al. |
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |

(56) References Cited

U.S. PATENT DOCUMENTS

| | | |
|---|---|---|
| 8,438,919 B2 | 5/2013 | Phillips et al. |
| 8,454,137 B2 | 6/2013 | Price et al. |
| 8,556,394 B2 | 10/2013 | Chen |
| 8,558,577 B1 | 10/2013 | Soriano Fosas et al. |
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,651,614 B2 | 2/2014 | Sakamoto et al. |
| 8,651,643 B2 | 2/2014 | Harvey et al. |
| 8,721,059 B2 | 5/2014 | Kodama et al. |
| 8,721,203 B2 | 5/2014 | Ehrhardt, Jr. |
| 8,752,943 B2 | 6/2014 | Hirano et al. |
| 8,864,277 B2 | 10/2014 | Rice et al. |
| 8,876,257 B2 | 11/2014 | Harada et al. |
| 8,888,207 B2 | 11/2014 | Furness, III et al. |
| 8,892,798 B2 | 11/2014 | Tailliet et al. |
| 8,898,358 B2 | 11/2014 | DeCesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson, III et al. |
| 9,137,093 B1 | 9/2015 | Abraham et al. |
| 9,176,921 B2 | 11/2015 | Fister et al. |
| 9,194,734 B2 | 11/2015 | Mehrer |
| 9,213,396 B1 | 12/2015 | Booth et al. |
| 9,213,927 B1 | 12/2015 | Ahne et al. |
| 9,254,661 B2 | 2/2016 | Otaka et al. |
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato et al. |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,412,461 B2 | 9/2019 | Long |
| 10,471,725 B2 | 11/2019 | Esterberg et al. |
| 10,875,318 B1 | 12/2020 | Gardner et al. |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Walmsley |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1* | 7/2008 | Yuen .................. B41J 2/1752 347/86 |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1 | 11/2012 | Prothon |
| 2013/0018513 A1 | 1/2013 | Metselaar |
| 2013/0054933 A1 | 2/2013 | Fister |
| 2013/0067015 A1 | 3/2013 | Vasters |
| 2013/0067016 A1 | 3/2013 | Adkins |

(56) References Cited

U.S. PATENT DOCUMENTS

| | | |
|---|---|---|
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost et al. |
| 2017/0169623 A1 | 6/2017 | Chen et al. |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade |
| 2018/0290457 A1 | 10/2018 | Ge et al. |
| 2018/0302110 A1 | 10/2018 | Solan |
| 2018/0304640 A1 | 10/2018 | Horne |
| 2019/0004991 A1 | 1/2019 | Foust |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1* | 4/2019 | Anderson ............... B41J 2/1753 |
| 2019/0118527 A1 | 4/2019 | Anderson et al. |
| 2019/0126631 A1 | 5/2019 | Anderson et al. |
| 2019/0137316 A1 | 5/2019 | Anderson et al. |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0078334 A1 | 3/2021 | Gardner |
| 2021/0221125 A1 | 7/2021 | Panshin |
| 2021/0334392 A1 | 10/2021 | Panshin et al. |

FOREIGN PATENT DOCUMENTS

| | | |
|---|---|---|
| CN | 2603934 Y | 2/2004 |
| CN | 1663800 A | 9/2005 |
| CN | 2734479 Y | 10/2005 |
| CN | 101477506 A | 7/2009 |
| CN | 101859235 A | 10/2010 |
| CN | 201761148 U | 3/2011 |
| CN | 102231054 A | 11/2011 |
| CN | 103072380 A | 5/2013 |
| CN | 203651218 U | 6/2014 |
| CN | 103946713 A | 7/2014 |
| CN | 102736627 B | 12/2014 |
| CN | 104417071 A | 3/2015 |
| CN | 104462931 A | 3/2015 |
| CN | 103879149 B | 6/2015 |
| CN | 105760318 A | 7/2016 |
| CN | 106104508 A | 11/2016 |
| CN | 107206816 A | 9/2017 |
| CN | 107209743 A | 9/2017 |
| CN | 108351246 A | 7/2018 |
| CN | 108819486 A | 11/2018 |
| CN | 209014461 U | 6/2019 |
| DE | 3712699 A1 | 11/1988 |
| EP | 0015954 B1 | 6/1984 |
| EP | 0720916 A2 | 7/1996 |
| EP | 0994779 A1 | 4/2000 |
| EP | 1164022 A2 | 12/2001 |
| EP | 1238811 A1 | 9/2002 |
| EP | 1285764 A1 | 2/2003 |
| EP | 1314565 A2 | 5/2003 |
| EP | 1389531 A1 | 2/2004 |
| EP | 1524120 A2 | 4/2005 |
| EP | 1800872 A1 | 6/2007 |
| EP | 1839872 A1 | 10/2007 |
| EP | 2237163 A1 | 10/2010 |
| EP | 2385468 A1 | 11/2011 |
| EP | 2854063 A1 | 4/2015 |
| EP | 3208736 A1 | 8/2017 |
| GB | 2519181 A | 4/2015 |
| JP | H04220353 A | 8/1992 |
| JP | 2001292133 A | 10/2001 |
| JP | 2002026471 A | 1/2002 |
| JP | 2003326726 A | 11/2003 |
| JP | 2005262458 A | 9/2005 |
| JP | 2009258604 A | 11/2009 |
| JP | 2010079199 A | 4/2010 |
| JP | 2011113336 A | 6/2011 |
| JP | 2012063770 A | 3/2012 |
| JP | 2013197677 A | 9/2013 |
| JP | 5644052 B2 | 12/2014 |
| JP | 2014534917 A | 12/2014 |
| JP | 2016185664 A | 10/2016 |
| JP | 2017196842 A | 11/2017 |
| JP | 2018049141 A | 3/2018 |
| JP | 2018136774 A | 8/2018 |
| JP | 2018161785 A | 10/2018 |
| JP | 2018531394 A | 10/2018 |
| KR | 20080003539 A | 1/2008 |
| KR | 101785051 B1 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2008117194 A1 | 10/2008 |
| WO | WO-2009145774 A1 | 12/2009 |
| WO | WO-2012020443 A8 | 2/2012 |
| WO | WO-2012054050 A1 | 4/2012 |
| WO | WO-2012057755 A1 | 5/2012 |
| WO | WO-2013048430 A1 | 4/2013 |
| WO | WO-2015116092 A1 | 8/2015 |
| WO | WO-2016061480 A2 | 4/2016 |
| WO | WO-2016114759 A1 | 7/2016 |
| WO | WO-2016130157 A1 | 8/2016 |
| WO | WO-2017074334 A1 | 5/2017 |

(56) References Cited

FOREIGN PATENT DOCUMENTS

| WO | WO-2017074342 A1 | 5/2017 |
|---|---|---|
| WO | WO-2017174363 A1 | 10/2017 |
| WO | WO-2017184147 A1 | 10/2017 |
| WO | WO-2017189009 A1 | 11/2017 |
| WO | WO-2017189010 A1 | 11/2017 |
| WO | WO-2017189011 A1 | 11/2017 |
| WO | WO-2017189013 A1 | 11/2017 |
| WO | WO-2018017066 A1 | 1/2018 |
| WO | WO-2018022038 A1 | 2/2018 |
| WO | WO-2018186847 A1 | 10/2018 |
| WO | WO-2018199886 A1 | 11/2018 |
| WO | WO-2018199891 A1 | 11/2018 |
| WO | WO-2018199895 A1 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 A1 | 4/2019 |
| WO | WO-2019078839 A1 | 4/2019 |
| WO | WO-2019078840 A1 | 4/2019 |
| WO | WO-2019078843 A1 | 4/2019 |
| WO | WO-2019078844 A1 | 4/2019 |
| WO | WO-2019078845 A1 | 4/2019 |

OTHER PUBLICATIONS

Epson, "Epson Provides the Best Inks for the Job," https://www.epson.co.nz/microsite/excellence/inks_why.asp, retrieved Jul. 1, 2019, 3 pgs.

Platform Development Team, "Development of the HP DeskJet 1200C Print Cartridge Platform," Hewlett-Packard Journal, Feb. 1994, pp. 46-54.

International Searching Authority, "International Search Report and Written Opinion," issued in connection with PCT/US2019/026159, dated Aug. 13, 2019, 15 pgs.

International Searching Authority, "International Search Report and Written Opinion," issued in connection with PCT/US2018/063624, dated Aug. 23, 2019, 13 pgs.

International Searching Authority, "International Search Report and Written Opinion," issued in connection with PCT/US2018/063630, dated Aug. 22, 2019, 15 pgs.

International Searching Authority, "International Search Report and Written Opinion," issued in connection with PCT/US2018/063633, dated Jul. 23, 2019, 12 pgs.

International Searching Authority, "International Search Report and Written Opinion," issued in connection with PCT/US2018/063638, dated Aug. 26, 2019, 13 pgs.

International Searching Authority, "International Search Report and Written Opinion," issued in connection with PCT/US2018/063643, dated Aug. 20, 2019, 13 pgs.

International Searching Authority, "International Search Report and Written Opinion," issued in connection with PCT/US2019/017511, dated Jul. 25, 2019, 12 pgs.

International Searching Authority, "International Search Report and Written Opinion," issued in connection with PCT/US2019/026124, dated Aug. 26, 2019, 15 pgs.

International Searching Authority, "International Search Report and Written Opinion," issued in connection with PCT/US2019/026133, dated Aug. 26, 2019, 18 pgs.

International Searching Authority, "International Search Report and Written Opinion," issued in connection with PCT/US2019/026145, dated Sep. 5, 2019, 16 pgs.

International Searching Authority, "International Search Report and Written Opinion," issued in connection with PCT/US2019/026161, dated Aug. 26, 2019, 20 pgs.

International Searching Authority, "International Search Report and Written Opinion," issued in connection with PCT/US2018/063631, dated Aug. 23, 2019, 13 pgs.

Maxim Integrated Products, "1-to-8 I2C Bus Switches/Multiplexers with Bus Lock-Up Detection, Isolation, and Notification," Sep. 2008, 22 pgs.

NXP, "Introducing A10006 Secure Authenticator Tamper-Resistant Anti Counterfeit Solution", retreived Jul. 3, 2019, 29 pgs.

NXP B.V., "NXP 2-, 4-, and 8-Channel I2C/SMBus Muxes and Switches PCA954x," Jul. 2008, 4 pgs.

NXP Semiconductors N.V., "PCA9641: 2-Channel I2C-Bus Master Arbiter," Oct. 27, 2015, 55 pgs.

Laureto, John et al., "Open Source Multi-Head 3D Printer for Polymer-Metal Composite Component Manufacturing," Technologies, MDPI, 2017, 5 (2), pp. 36, 23 pgs.

NXP Semiconductors N.V., "PCA9547: 8-Channel I2C-Bus Multiplexer with Reset," Apr. 1, 2014, 34 pgs.

NXP Semiconductors N.V., "AN11593: How to Design in and Program the PCA9641 I2C Arbiter," Oct. 23, 2014, 22 pgs.

Reddit, "Use an Accelerometer to Measure Z wobble", retrieved Jul. 1, 2019, 3 pgs, https://www.reddit.com/r/Reprap/comments/6qsoyd/use_an_accelerometer_to_measure_z_wobble/.

Phillips Semiconductors, "The I2C-Bus Specification", Version 2.1, Jan. 2000, 46 pgs.

United States Patent and Trademark Office, "Non-Final Office Action," issued in connection with U.S. Appl. No. 16/502,479, dated Dec. 11, 2019, 13 pgs.

United States Patent and Trademark Office, "Non-Final Office Action," issued in connection with U.S. Appl. No. 16/460,016, dated Sep. 12, 2019, 12 pgs.

United States Patent and Trademark Office, "Non-Final Office Action," issued in connection with U.S. Appl. No. 16/505,090, dated Sep. 10, 2019, 20 pgs.

United States Patent and Trademark Office, "Notice of Allowance," issued in connection with U.S. Appl. No. 16/502,479, dated Apr. 9, 2020, 9 pgs.

United States Patent and Trademark Office, "Notice of Allowance," issued in connection with U.S. Appl. No. 16/460,016, dated Mar. 25, 2020, 10 pgs.

United States Patent and Trademark Office, "Notice of Allowance," issued in connection with U.S. Appl. No. 16/505,090, dated Feb. 12, 2020, 9 pgs.

United States Patent and Trademark Office, "Notice of Allowance," issued in connection with U.S. Appl. No. 16/505,090, dated Oct. 22, 2019, 5 pgs.

United States Patent and Trademark Office, "Notice of Allowance," issued in connection with U.S. Appl. No. 16/728,207, dated Feb. 19, 2020, 19 pgs.

United States Patent and Trademark Office, "Restriction Requirement," issued in connection with U.S. Appl. No. 16/502,479, dated Aug. 15, 2019, 7 pgs.

\* cited by examiner

LOGIC CIRCUITRY PACKAGE

CROSS REFERENCE TO RELATED APPLICATIONS

This application is a U.S. National Stage Application of PCT Application No. PCT/US2019/058172, filed Oct. 25, 2019, entitled "LOGIC CIRCUITRY PACKAGE," which claims priority to PCT Application No. PCT/US2019/026133, filed Apr. 5, 2019, entitled "LOGIC CIRCUITRY"; PCT Application No. PCT/US2019/026152, filed Apr. 5, 2019, entitled "FLUID PROPERTY SENSOR"; PCT Application No. PCT/US2019/026161, filed Apr. 5, 2019, entitled "LOGIC CIRCUITRY"; and PCT Application No. PCT/US2018/063631, filed Dec. 3, 2018, entitled "LOGIC CIRCUITRY"; all of which are incorporated herein by reference.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

DETAILED DESCRIPTION

Figure 1:
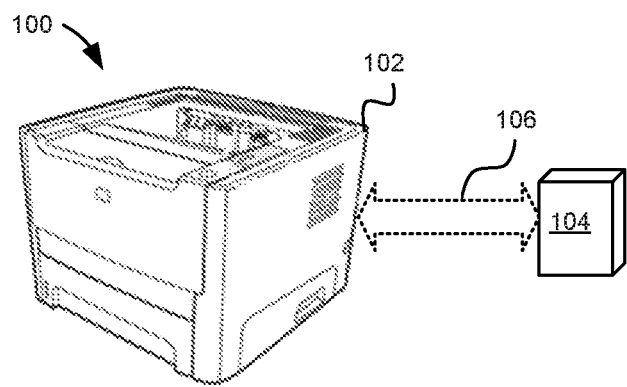
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other.

Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests. In this disclosure, a command is also a type of request.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
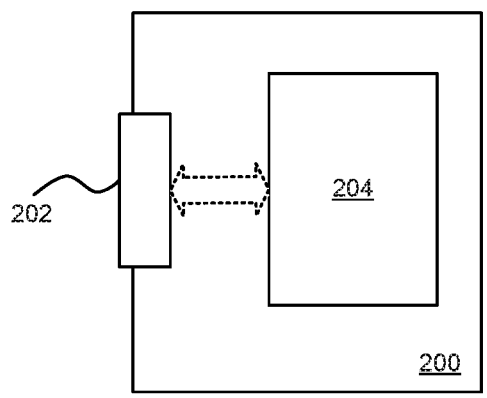
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
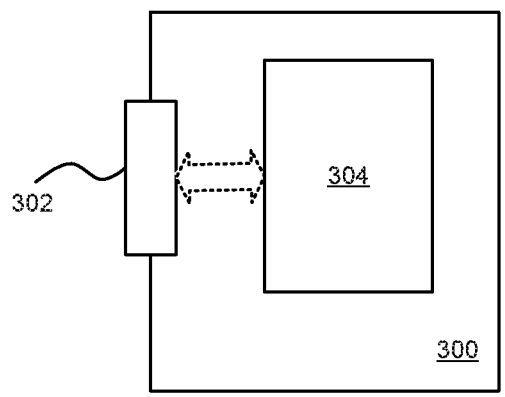
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
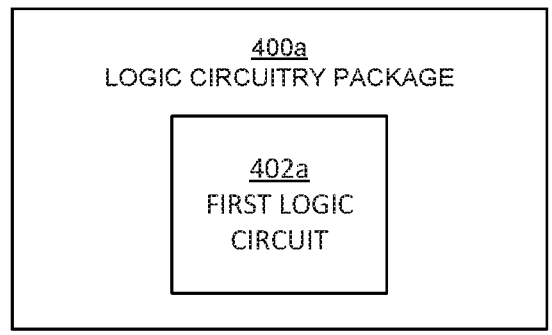
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. The hardware logic circuit can include analog sensor functions. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store clock enable, clock divider, and/or dither parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
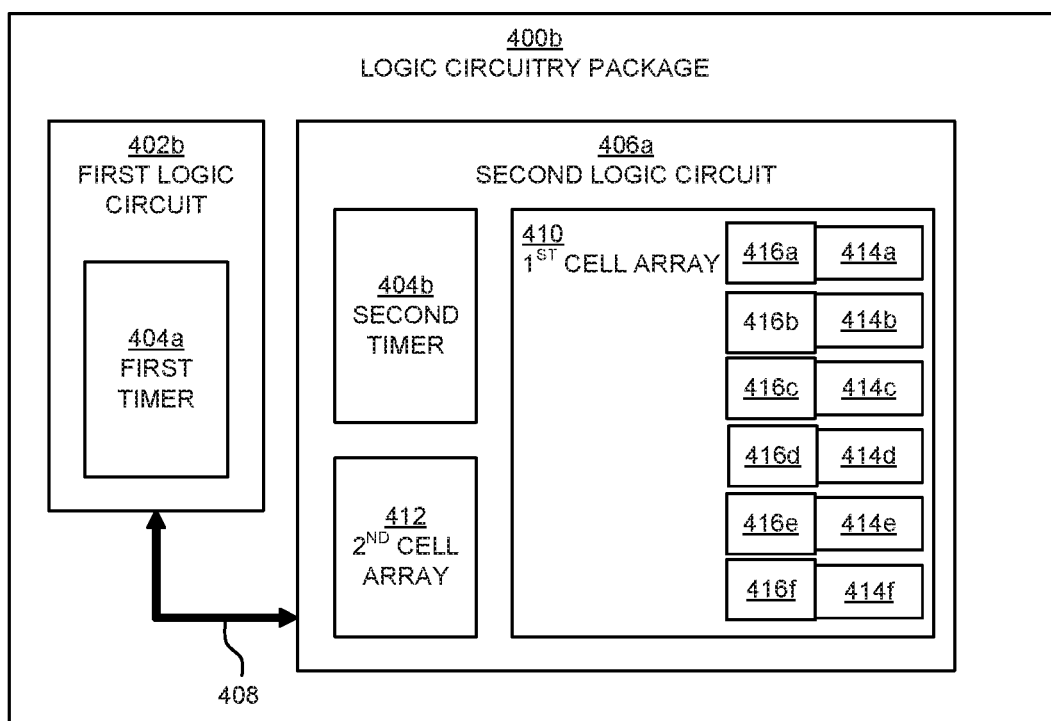

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408. In other examples, that are not the topic of FIG. 4B, a single integrated logic circuit may simulate the functions of the second logic circuit.

Back to FIG. 4B, in one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include a digital "clock tree". In other examples, the timer 404a may include an RC circuit, a ring oscillator, or some other form of oscillator or timer. In yet other examples, the timer may include a plurality of delay circuits each of which is set to expire after a certain time period, whereby depending on the timer period indicated in a first command, the delay circuit is chosen.

In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b. The first logic circuit 402b is configured to use the first timer 404a to determine the duration of the enablement, that is, to set the time period of the enablement.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to reconfigure the initial second address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register. For example, while the first address of the first logic circuit is different for each different associated print material (e.g., different color inks have different first addresses), the second logic circuits can be the same for the different print materials and have the same initial second address.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may also be identifiable by sensor ID. The sensor ID may include both the sensor type ID to select the array or type and the sensor cell ID to select the cell in the selected type or array, whereby the latter may also be called "sub-"ID. The sensor IDs (including the sub-IDs) may include a combination of addresses and values, for example register addresses and values. The addresses of the sensor cell array ID and the sensor cell ID may be different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs. In examples where there is only one cell of a certain sensor type, one sensor ID may be sufficient to select that cell. At the same time, for that single sensor cell, different sensor "sub-"IDs will not affect the sensor cell selection because there is only one sensor cell. In this disclosure, sensor ID parameters are described. A sensor ID parameter may include a sensor ID. A sensor ID parameter may include a sensor type ID or a sensor cell ID. The same sensor ID (e.g., to select a sensor type) and different sensor sub-IDs (e.g., to select a sensor cell) may be used to select different sensor cells. The sensor ID parameters can include only the sensor sub-ID, for example where the sensor type has been previously set so that only the sensor cell needs to be selected.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors (e.g., crack sense resistors), etc. In this disclosure, different sensor types may also be referred to as different sensor classes. As mentioned, earlier, this disclosure encompasses alternative examples (e.g., mentioned with reference to FIGS. 6 and 12) of logic circuitry packages without the described analog sensor cell arrays, whereby responses may be generated based on class parameters (i.e., sensor ID parameters) without using a physical sensor cell for generating the output.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensors (e.g., cells 414a-414f) and a series of heating elements (e.g., cells 416a-416f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406a. More than two different sensor types may be provided, for example three, four, five or more sensor types, may be provided, wherein each sensor type may be represented by one or more sensor cells. Certain cells or cell arrays may function as stimulators (e.g., heaters) or reference cells, rather than as sensors.

Figure 4C:
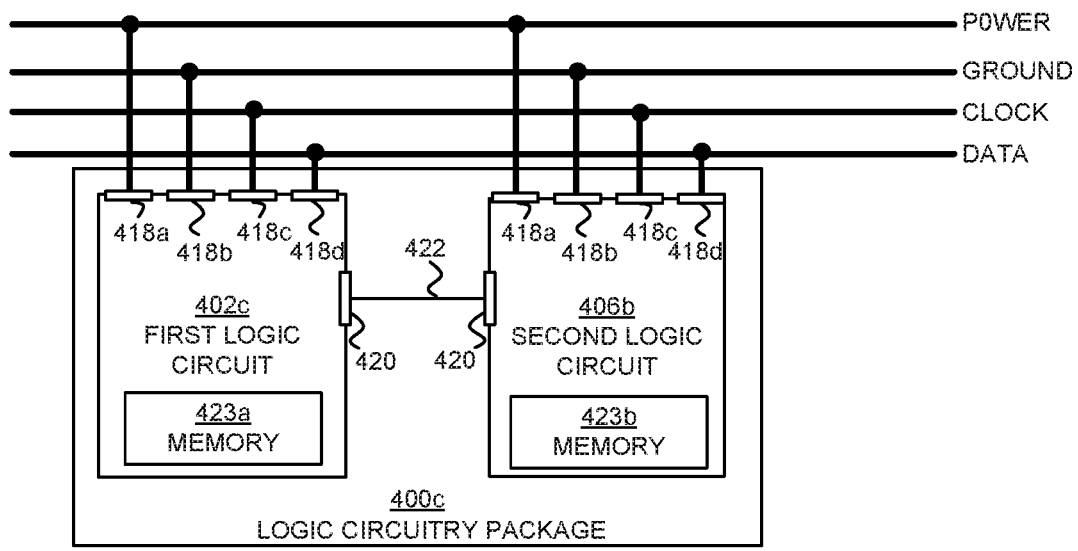

FIG. 4C illustrates an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-418d connecting to the Power, Ground, Clock, and Data lines of an I2C bus. In another example, four common connection pads are used to connect both logic circuits 402c, 406b to four corresponding connection pads of the print apparatus controller interface. It is noted that in some examples, instead of four connection pads, there may be fewer connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b include a memory 423a, 423b. The memory 423a of the first logic circuit 402c stores information including cryptographic values (for example, a cryptographic key and/or a seed value from which a key may be derived) and identification data and/or status data of the associated replaceable print apparatus component. In some examples, the memory 423a may store data representing characteristics of the print material, for example, any part, or any combination of its type, color, color map, recipe, batch number, age, etc. The first logic circuit 402c may be, or function as, a microcontroller or secure microcontroller.

In this example, memory 423b of the second logic circuit 406b includes a programmable address register to contain an initial address of the second logic circuit 406b when the second logic circuit 406b is first enabled and to subsequently contain a new (temporary) second address (in some examples in a volatile manner) after that new second address has been communicated by the print apparatus. The new, e.g., temporary, second address may be programmed into the second address register after the second logic circuit 406b is enabled, and may be effectively erased or replaced at the end of an enablement period. In some examples, the memory 423b may further include programmable registers to store any, or any combination of a read/write history data, cell (e.g., resistor or sensor) count data, Analog to Digital converter data (ADC and/or DAC), and a clock count, in a volatile or non-volatile manner. The memory 423b may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406b).

While the memories 423a, 423b are shown as separate memories here, they could be combined as a shared memory resource, or divided in some other way. The memories 423a, 423b may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400c is shown in FIG. 4C, there may be a plurality of packages with a similar or a different configuration attached to the bus.

Figure 4D:
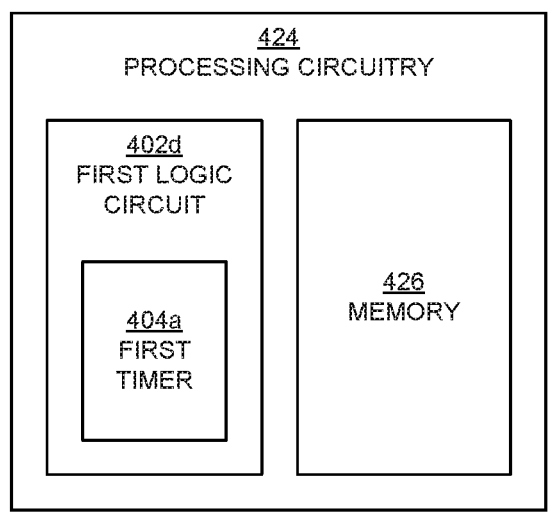

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402*d* which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402*d*. The first logic circuit 402*d* may have any of the attributes of the other examples circuits/packages described in this disclosure.

The first logic circuit 402*d* is adapted to participate in authentication of the print materials container by a print apparatus in which the container is installed. For example, this may include a cryptographic process such as any kind of cryptographically authenticated communication or message exchange, for example based on a key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402*d* may participate in a message to derive a session key with the print apparatus and messages may be signed using a message authentication code based on such a session key. Examples of logic circuits configured to cryptographically authenticate messages in accordance with this paragraph are described in US patent publication No. 9619663.

In some examples, the memory 426 may store data including: identification data and read/write history data. In some examples, the memory 426 further includes cell count data (e.g., sensor count data) and clock count data. Clock count data may indicate a clock speed of a first and/or second timer 404*a*, 404*b* (i.e., a timer associated with the first logic circuit or the second logic circuit). In some examples, at least a portion of the memory 426 is associated with functions of a second logic circuit, such as a second logic circuit 406*a* as described in relation to FIG. 4B above. In some examples, at least a portion of the data stored in the memory 426 is to be communicated in response to commands received via the second address, for example the earlier mentioned initial or reconfigured/temporary second address. In some examples, the memory 426 includes a programmable address register or memory field to store a second address of the processing circuitry (in some examples in a volatile manner). The first logic circuit 402*d* may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402*d* via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402*d* addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404*a*, 404*b* as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor. In an alternative example, the processing circuitry 424 may include a single, integral logic circuit, and one or more sensors of one or more types.

Figure 4E:
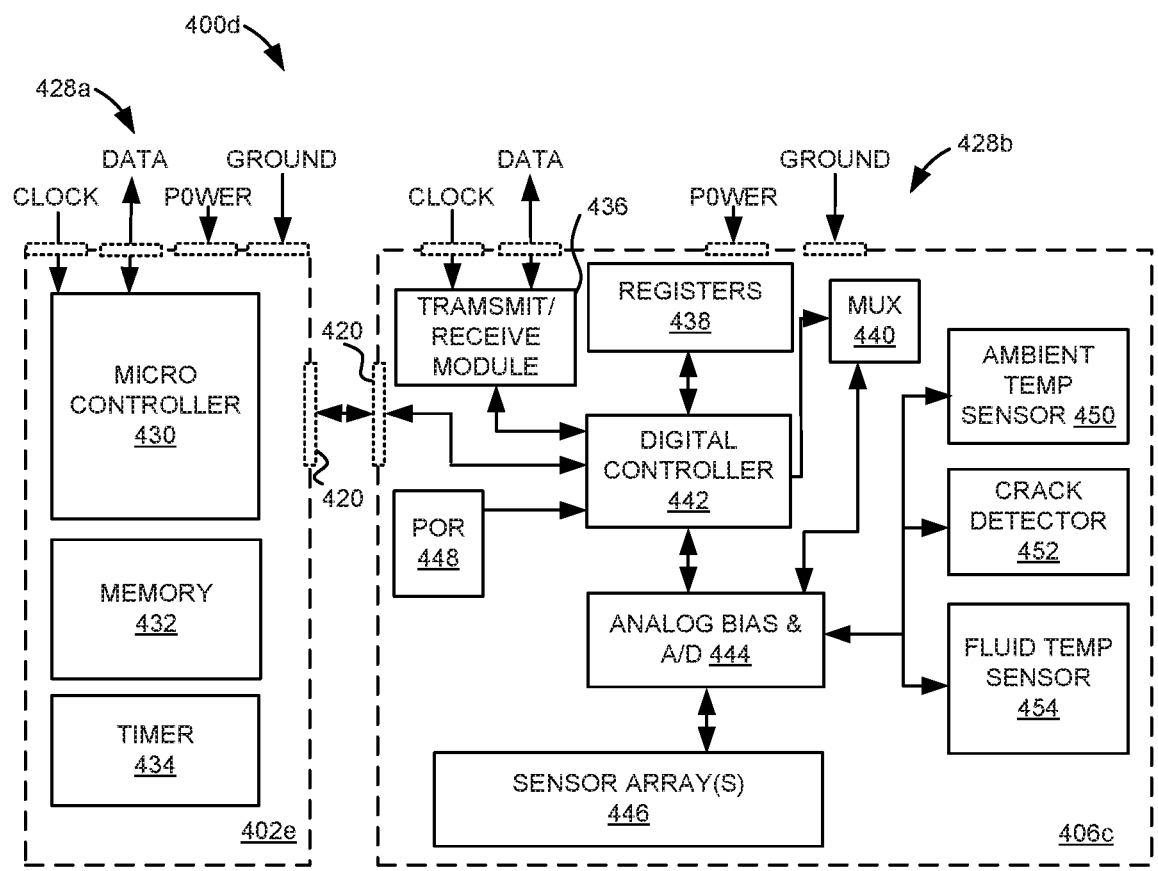

FIG. 4E illustrates another example of a first logic circuit 402*e* and second logic circuit 406*c* of a logic circuitry package 400*d*, which may have any of the attributes of the circuits/packages of the same names described herein, which may connect to an I2C bus via respective interfaces 428*a*, 428*b* and to each other. In one example the respective interfaces 428*a*, 428*b* are connected to the same contact pad array, with only one data pad for both logic circuits 402*e*, 406*c*, connected to the same serial I2C bus. In other words, in some examples, communications addressed to the first and the second address are received via the same data pad.

In this example, the first logic circuit 402*e* includes a microcontroller 430, a memory 432, and a timer 434. The microcontroller 430 may be a secure microcontroller or customized integrated circuitry adapted to function as a microcontroller, secure or non-secure.

In this example, the second logic circuit 406*c* includes a transmit/receive module 436, which receives a clock signal and a data signal from a bus to which the package 400*d* is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406*c* without use of a contact pin 420.

The analog bias and analog to digital converter 444 receives readings from the sensor array(s) 446 and from additional sensors 450, 452, 454. For example, a current may be provided to a sensing resistor and the resultant voltage may be converted to a digital value. That digital value may be stored in a register and read out (i.e., transmitted as serial data bits, or as a 'bitstream') over the I2C bus. The analog to digital converter 444 may utilize parameters, for example, gain and/or offset parameters, which may be stored in registers.

In this example, there are different additional single sensors, including for example at least one of an ambient temperature sensor 450, a crack detector 452, and/or a fluid temperature sensor 454. These may sense, respectively, an ambient temperature, a structural integrity of a die on which the logic circuitry is provided, and a fluid temperature.

Figure 5A:
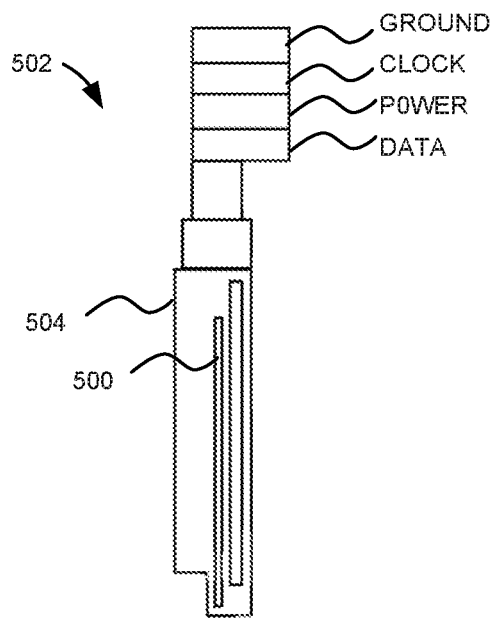
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
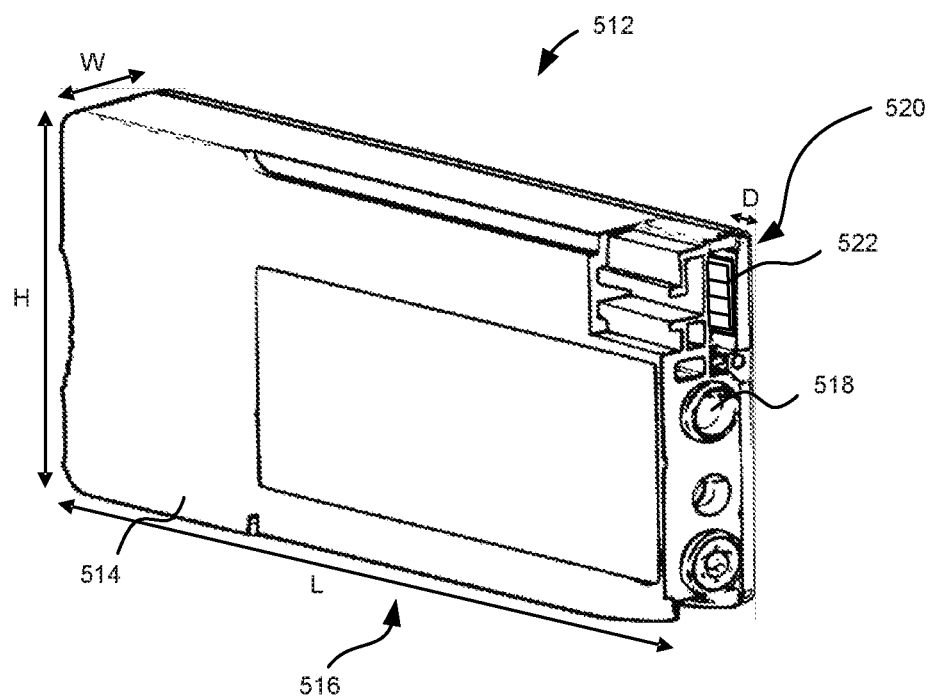
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

Figure 6:
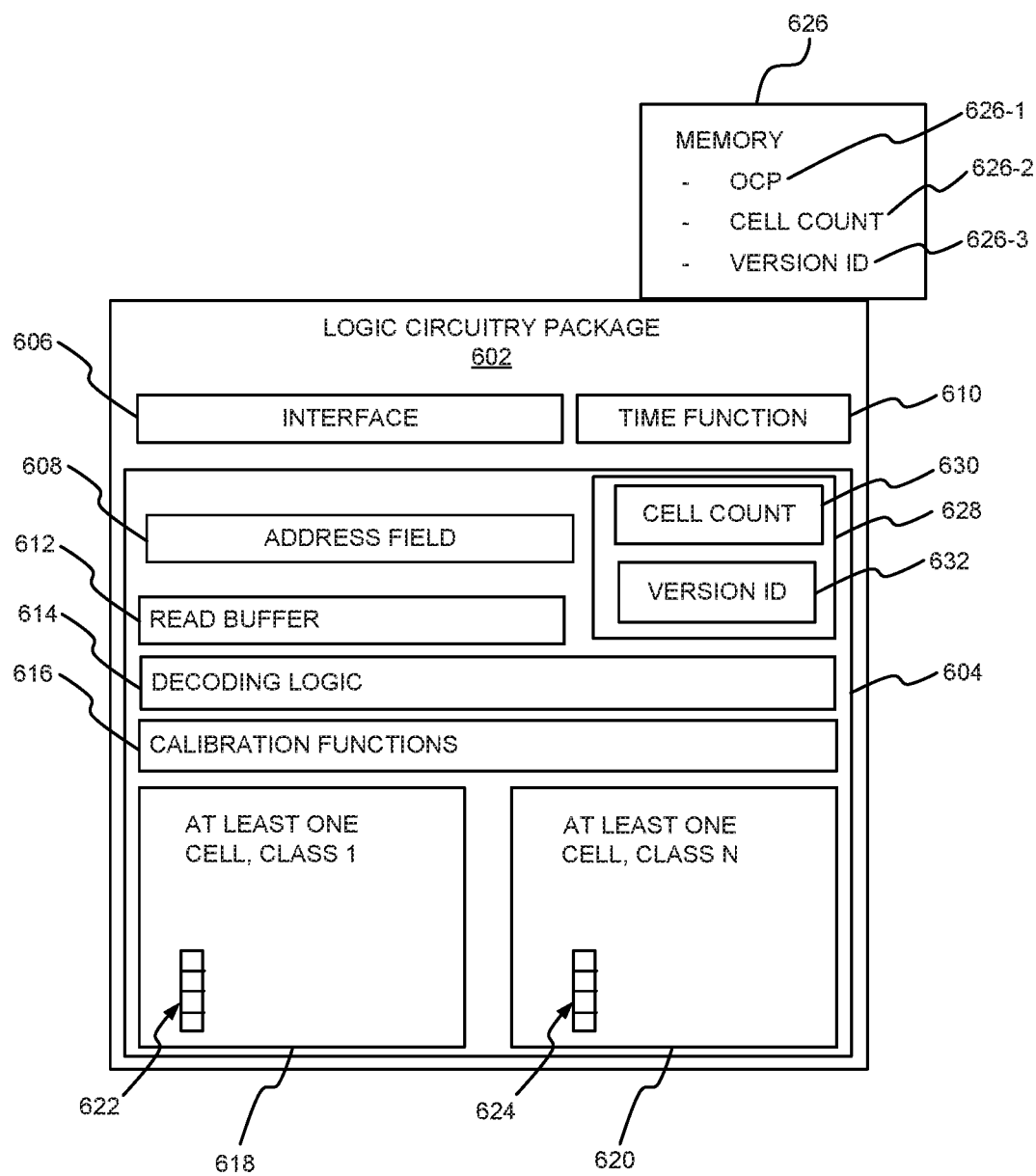
FIG. 6 illustrates another example of a logic circuitry package.

FIG. 6 illustrates another example of a logic circuitry package 602 for a replaceable print component in accordance with different examples of this disclosure. The logic circuitry package 602 may be an intermediate product, configured to be part of a replaceable print component such as a 2D or 3D print cartridge including a reservoir for print material. The print material may be a print liquid (e.g., ink) or print powder (e.g., toner, 3D build powder) or any other agent to print in two-dimensional or three-dimensional print processes.

The logic circuitry package 602 includes at least one logic circuit 604, for example a plurality of interconnected logic circuits, physically integrated in a single support structure or physically separated using different support structures. The package may include a molded compound and/or the print material container as a support structure, whereby sub-circuits or (sensor) cells of the package may be physically electrically connected or wirelessly connected. Where there are different logic circuits, these may be interconnected, at least through the interface 606 and/or through other wiring or wireless interfaces. In one example, the logic circuitry package 602 includes a first logic circuit that is a microcontroller or has the properties of a microcontroller. In a further example, the package 602 includes a logic circuit 604 that responds to commands directed to a different address than a default I2C communication address of the first logic circuit. The logic circuit 604 can be the second logic circuit described above and/or a sensor circuit. The first and second logic circuit addressed previously may be connected to the same interface 606, and may be, but need not be, packaged together in this package 602. In another example, the logic circuitry package 602 has only a single integrated logic circuit with integrated functions, for example in a single compact package.

The logic circuitry package 602 may include a communication interface 606 to communicate with a print apparatus logic circuit through an interface bus, such as an I2C serial communication bus, for example connecting power, data, clock and/or ground, as explained earlier (certain examples may use fewer contacts and harvest power from the clock or data signal). In other examples, the interface 606 may facilitate digital communications that are not in accordance with an I2C communication protocol. In yet other examples, the interface 606 may facilitate analog communications.

In accordance with earlier mentioned principles in this disclosure, the logic circuit 604 may include an address field 608. The address field 608 facilitates that the logic circuit 604 transmits command portions received from the print apparatus logic circuit and directed to the address of the address field 608 to the different functions of the logic circuit 604. The address field 608 may have a default second address (e.g., after reset) and may be adapted to facilitate reconfiguration of its set address to any (e.g., random) new second address. The logic circuit 604 may further include a time function 610 such as a timer or delay circuit that may be monitored or may be set to expire at the end of a specified time period, so that after the time period the logic circuitry package 602 again processes communications over the first address different than the address of the address field 608. The time function 610 is referred to as timer in previous examples of this disclosure.

The timer may include an integral timer, internal to the logic circuitry, for example including a Resistance-Capacitor (RC) circuit configured to act as a timer, logic gates configured with a counter, a crystal or a ring oscillator, a phase lock loop (also known as a phase-locked loop) or the like, or any timer which may logically form part of a logic circuitry package 602. The timer may provide an internal clock signal which is provided even in the absence of a clock signal on the serial data bus. The timer may count and thus allow for determination of the duration of the timer period specified in the first command. In one example, a delay circuit may be provided for the time function which may be at least partly the same as the timer, only that it can be set to expire in accordance with the specified time period, and hence, it does not require monitoring by a controller function of the logic circuitry package 602. The delay circuit may include a plurality of selectable delay circuits, each expiring after a different duration. The delay circuit may include a plurality of delay line switches, each set to expire after a characteristic duration. An example of a delay line switch includes a transistor with a leaking floating gate, or an R-C circuit and a comparator, for example similar to aspects of the timer. In one example, the delay function is configured to, upon receipt of the first command, select the delay line switch that corresponds with the specified time period and enable it.

The package 602 includes a read buffer 612 to be read by the print apparatus logic circuit, for example, through the serial bus interface 606. In one example, the logic circuit 604 is to load a value to the buffer 612 in response to a read request, which value has been generated based on certain previously set or communicated parameters. In other examples, the logic circuit 604 may be configured to output analog signals.

The package 602 further includes decoding logic 614 to identify calibration, class and/or sub-class parameters in an input command stream, which parameters condition the output of the logic circuit 604. The class and sub-class parameters are referred to as sensor ID parameters in other portions of this disclosure. For example the class and sub-class parameters correspond to the sensor ID and the sub-ID, whereby the sensor ID parameters may encompass both the class and sub-class parameters.

The package 602 includes calibration logic including one or more calibration functions 616 to calibrate the output based on the calibration parameters received from the print apparatus logic circuit. The calibration logic may be common calibration logic to calibrate inputs and/or outputs (calibrating an input may affect the output and may in this disclosure be included in calibrating the output) for a plurality of classes.

As will be explained below, each parameter may specify a function (e.g., to indicate which function to address like a certain calibration function, class selection function, or sub-class selection function) and a value (e.g., to set the ID or magnitude of the selected function, for example, to identify which sensor or cell to select). The decoding logic 614 may be configured to identify these parameters and select or set a corresponding logic function (e.g., set a calibration function based on the calibration value; select a sensor based on the class ID; select a sensor cell based on the sub-class ID). The logic circuit 604 may be configured to respond to each read request with an output (e.g., count value) based on the parameters that were last communicated by the print apparatus logic circuit, or, where for certain logic functions no parameters were communicated, based on certain default-parameters-after-reset. In this disclosure logic functions may include a variety of different calibration functions, class selection functions (e.g., sensor select functions) and sub-class select functions (e.g., sensor cell select functions), whereby respective logic functions may be set or selected in accordance with the received parameters. For example, a plurality of logic functions may be selected/set based on a single command stream such as selecting a sensor based on a class parameter, selecting a cell of that sensor based on a sub-class parameter, and, applying certain calibration settings based on certain calibration parameters.

The logic circuit 604 may include at least two cell classes, for example a first and second cell class, each associated with a cell array of nominally the same cells in the same array, yet nominally different between the arrays/classes. The logic circuit 604 may include further cell classes, for example a third and fourth class, each of which is defined by not more than one cell that provides a respective single cell output. In different examples, at least two, three, four, five, six or more different cell classes may be provided, wherein each cell of each class is nominally different than each cell of other classes. For the purpose of illustration, FIG. 6 shows only a limited amount of cell classes 618, 620 and cells 622, 624. In other examples, there could be greater numbers of cell arrays and cells. Cell arrays 618, 620 including sensor cells 622, 624 may also be referred to as sensors, wherein cells of different classes have different sense functions.

In this example, different sensor types may be denominated by class, and cells of the same type may be denominated by sub-class. The example logic circuitry package 602 includes different cell arrays 618, 620 of different classes. Each cell class may be associated with a particular type of cell 622, 624. For example, each cell may be an electrical component and each cell class may refer to an array of electrical components having the same electrical properties. The same properties may refer to the same nominal electrical properties, for example defined by material, physical design, etc. There may be marginal differences between cells of the same array having the same nominal properties due to tolerances or imperfections in fabrication and materials. The cells may have at least approximately the same electrical properties within certain manufacturing tolerances, for example including sensitivity, resistance, impedance, capacitance, conductivity, etc.

Each cell may provide a respective output value or signal in response to being selected and when under charge, whereby the output or signal may be representative of a state of the cell, for example an electrical property state. Print apparatus commands may be received by a logic circuit 604, and class and sub-class parameters may be identified, to facilitate selecting a respective sensor type and sensor cell, respectively, of the logic circuit 604.

The logic circuitry packages 602 may be provided with at least three or four different cell classes. One or two of those classes may include at least 10, 20, 40, 60, 80, 100, or 126 sub-classes, for example, cells of the same nominal characteristics yet associated with different IDs such as different cell numbers. Cells of sensor cell arrays may be selected by associated class and sub-class parameters using the decoding logic 614, to facilitate reading each selected sensor cell by the print apparatus logic circuit. Furthermore, the logic circuitry package 602 may include at least one individual single-cell sensor in which case class parameters may be sufficient to select the cell and sub-class parameters are redundant.

The logic circuit 604 may be configured so that cells 622, 624 of different cell arrays 618, 620 are selected by the same parameter values, for example, after being selected by different class parameters. For example, cells of different classes use the same series of IDs, wherein the IDs can be embodied by binary numbers. This may facilitate sharing of circuitry such as certain decoding logic functions. For example, all or some of the cells of different arrays 618, 620 may be associated with the same cell numbers. For example, the first and further cells of the first cell array are denominated 1, 2, 3 . . . n and the first and further cells of the second cell array are also denominated 1, 2, 3 . . . n. These numbers may be encoded in binary fashion. In other words, a cell of a first class and a cell of a second class, which are nominally different, may be selected using the same sub-class parameters, but preceded by different cell class selections parameters in the command stream.

In other, alternative, virtual embodiments, classes and other parameters are associated with respective portions of a look-up table (LUT), in addition to, or instead of, the physical cells. In, again, other alternative examples algorithms may be used to output certain values based on identified class and other parameters, whereby the classes and/or sub-classes may be difficult to detect. The example of FIG. 6 illustrates different physical cell classes 618, 620 and different physical cell sub-classes 622, 624 whereas alternative, virtual logic functions are discussed elsewhere in this disclosure, such as with reference to FIG. 12.

The physical cells may include electrical components including resistors, strain gauges, diodes, different types of sensors, but also "dummy" cells, test cells or reference cells, for a variety of purposes. In one example, the cells are sensor cells.

Calibration functions 616 may include calibration logic such as one or a combination of offset circuits, gain amplifiers, different AD and DA converter circuits, heater arrays, or virtual (programmed) calibration functions. A virtual calibration function may use offset or amplifier functions similar to hardwired calibration logic circuits. Different calibration functions may be combined in a single calibration logic circuit.

The logic circuitry package 602 may include a memory 626 to store certain characteristics of the logic circuit 604. The memory 626 may be part of the logic circuit 604 or may be separate from the logic circuit 604.

In one example, a second memory 628 is part of the logic circuit and stores a cell count 630 indicative of a number of cells associated with at least one class or with a plurality of classes with the same number of cells. In one example, the cell count 630 is a last cell number (which may be the total number of cells minus one as the first cell may be represented by a 0). For example, the cell count corresponds to a maximum number of cells of one, two, three or more predetermined classes. For example, a logic circuit may have a certain number of temperature sensor cells 624 and the same number of strain sensing cells 622. In another example, a first memory 626, associated with a first address, and the second memory 628, associated with a second address, each store the cell counts 626-2, 630, respectively in a differently encoded fashion. In another example, a value associated with a version/revision ID 632 of the logic circuit 604 is stored in the second memory 628. In one example, the second memory 628 is embodied by a series of memory fields such as registers, addressable by memory addresses.

The cell count and/or version/revision ID can be stored as part of digitally signed data. The count and ID associated with the first (626-2, 626-3) versus second address (630, 632) may match, that is, contain the same yet differently encoded value, in a way that is to be validated by the print apparatus. The data associated with the first versus the second (default or new) communications address, for example stored in the first versus second memory, may be encoded differently, for example, signed and/or encrypted where it is associated with the first address versus not signed and/or not encrypted, respectively, where it is associated with the second address. While the example of FIG. 6 illustrates two separate memories 626, 628, in an alternative example, the logic circuit 604 includes a single memory with the same data, and wherein the logic circuit 604 may be configured to encode the data depending on whether the print apparatus command is directed to the first versus the second address.

The decoding logic 614 is configured to identify, from a command stream received from the print apparatus, class parameters to select respective cell classes 618, 620 based on the parameters. The logic circuit 604 is configured to respond with output values or signals representing the selected cell class. As explained, the cell class may be associated with a cell array 618, 620 or a single cell (e.g., see the example of FIG. 4E). Similarly, the decoding logic 614 is further configured to identify, from the command stream, cell sub-class parameters, to select a cell 622, 624 of a previously selected cell array 618, 620.

The decoding logic 614 may be configured to load the parameters specified in commands and select the corresponding sensors and cells, or set the corresponding calibration functions. For example, the decoding logic 614 includes a memory field arrangement to store parameters for respective logic functions, the logic functions including the calibration function 616 as well as the sensor classes 618, 620, and sensor cells 622, 624. Each memory field may be adapted to store a parameter for a connected logic function, for example to store a cell class number, a cell number, a calibration parameter, etc. The memory field arrangement may include shift registers as explained in earlier examples. The decoding logic 614 may further include multiplex logic to set the logic functions in accordance with the parameters stored in the memory fields, for example connecting these memory fields with the logic functions. The multiplex logic may include a series of flip-flops, latches, and/or switches. In one example, upon receiving commands specifying the second (default or new) communication address, the decoding logic 614 loads the respective parameters and shifts the bit values to set or select the respective logic function.

In one example, communicated parameters identify each function by a register address. The decoding logic 614 may include 8-bit input registers whereby each register is associated with a particular function, such as the sensor selection, cell selection and (a particular type of) calibration, for example through the multiplex logic. Alternative examples that are discussed elsewhere in this disclosure may use virtual decoding logic functions, embodied by instructions to be executed by a processor, to identify the parameters in the command stream and set or select respective (virtual) logic functions to provide outputs that the print apparatus logic circuit may validate.

The logic circuit 604 is configured to, when the sensor cells are charged, and a respective cell is selected, output a value representing a reading of the selected cell, whereby the output is calibrated in accordance with the (received or default) calibration parameters. A cell reading inside the logic circuit 604 may include a voltage or other analog reading, while an output after conversion may be a digital value such as an output count value. The logic circuit 604 is configured to, in response to a read request, output a respective value or signal associated with the (last) selected cell, applying the last received calibration parameters. The output, be it digital or analog, may represent a state of a selected cell, such as temperature, stress, resistance, voltage state, etc.

The "parameters" in the commands condition the output by the logic circuit 604. The parameters may select a particular cell of a particular sensor in an array, or a particular calibration setting. Another parameter that conditions the output is the time period during which the package 602 responds to commands directed to a second and/or new address different from the first address, although it may condition the output duration and input address rather than individual output count values.

"Identifying" a parameter in a command stream, such as a class, sub-class or calibration parameter, includes distinguishing the respective parameters from other bits in a bitstream (like other not-related commands, start bits, end bits, acknowledge bits, communication address bits, etc.), to be able to process and/or act upon these parameters to appropriately condition responses. This decoding ability (i.e., decoding function) may be hardwired or programmed or both. For example, by identifying a class or sub-class parameter, the decoding logic 614 may use the associated class or sub-class for generating the output, either through physical electrical measurements and/or through a LUT or calculation, or in a hybrid fashion that combines physical cell readings with virtual data to generate a digital output. Various hardwired examples with analog sensor arrays have been described in this disclosure as well as alternative "virtual" examples that are designed to emulate the output in accordance with their hardwired/analog counterparts.

In one example, at least one calibration function 616 of the logic circuit 604 is to condition the output based on the input calibration parameters. In this disclosure, it may be understood that conditioning an input (e.g., DA conversion, offsetting and/or amplifying an input to cells before conversion by the cells) also conditions the output. Hence any signal calibration between command and response may be considered as conditioning the output. Calibration parameters may be adjusted by the print apparatus logic circuit based on returned output values. After reading an output of the logic circuit 604, based on certain previous calibration parameters, the print apparatus logic circuit may send new calibration parameters in response to which the logic circuit 604 may output new outputs.

Certain operational calibration parameters may be used to set a cell output to a suitable value within an operational or readable output range to facilitate determining a suitable range of different states of a respective cell. Furthermore, certain operational calibration parameters may be determined for returning states of multiple cells within the suitable range. Operational calibration parameters for one class may be different than operational calibration parameters for another class. Different nominal electrical properties between different classes may result in different outputs between these classes, even where the applied charge and calibration parameters are the same. That said, it may be that specific operational calibration parameters can be made to work for one and the other class. Such specific calibration parameters could include a relatively low amplifier parameter. For low amplifier parameters, however, a variation between outputs of different cells may be relatively small, for example too small to be able to correctly determine different cell states. In examples of this disclosure, certain more optimal operational calibration parameters tend to be different for different classes, and there may be different sets or ranges of operational calibration parameters between classes. Also, calibration parameters related to a heater function may be used to influence output of a temperature sensor cell array while such heater function may not suitably influence output of a strain sensing cell array.

The calibration functions 616 may be integral to the logic circuit 604. Calibration functions 616 may include offset functions, amplifier functions, and conversion functions. These functions could be hardwired and defined by offset circuits, gain amplifiers and AD (Analog to Digital) or DA (Digital to Analog) conversion circuits, respectively, separately or in combination. For example, an offset and DA conversion may be combined in a single logic (e.g., VDAC) function, for example, where the offset function is provided by the DA converter, that, besides converting, is also configured to offset (i.e., set) an input power or voltage or a reference voltage, with respect to a power and ground of the I2C interface 606.

Further calibration functions 616 may include heat cell (i.e., heater) selections, heat power settings, heat timing, for example, for association with a temperature sensor array 620 to sense print material level. Alternative example calibration functions are embodied by programmed instructions, for example configured to offset or amplify certain input values on the basis of received calibration parameter values for example using a LUT or calculation.

In one example, each memory field of the decoding logic 614 is associated with a predetermined calibration function 616. The decoding logic 614 identifies received calibration parameters to store parameter values in associated memory fields, for usage as input parameter for the selected calibration function 616. In a non-operational, e.g., on-the-shelf and/or after-reset state, the calibration function 616 may be pre-set to default values. The calibration function 616 may be configured to switch to default values at or after each second/new address-enablement between time periods. Default or previously written calibration values apply to each of the calibration functions until a command is provided with new calibration values which replace (e.g., overwrite) the previous calibration values.

In one example, the same calibration functions 616 may commonly apply to a plurality of classes 618, 620. For example, the amplifier and/or offset functions are configured to calibrate outputs of cells of both first and second cell arrays, or of all cell classes. Hence, where certain calibration parameters are applied to cells of a first array, they can be repeated for a second array if no new calibration parameters have been set, at least during the same time period where the second/new address is enabled. In certain instances, however, a print apparatus logic circuit may choose to apply different calibration parameter values to different classes, for example to use more optimal operational calibration parameters for a respective class. Therefore, when the logic circuit 604 receives a new class parameter to select a new class, previously used operational calibration parameters with which in-range output values were generated for a previous class, may now generate outputs outside of the range or at the ends of the range, i.e., not-operational calibration parameters, so that new (operational) calibration parameters are applied for the new class.

In a further example, a heating element array or heater cell array may be provided, which in one example is considered one of the calibration functions 616, for example part of the calibration logic. Such heater cell array may extend along a corresponding temperature sensor cell array (for example, see also FIG. 4B and international patent application publication WO2017/074342). Correspondingly, certain input heat parameters such as heater cell selection, heat time and heat power may be considered calibration parameters. Changing the heat parameters may in fact influence the state of the temperature sensor cells, different than certain other calibration parameters (offset, amplify) that only calibrate the output value without directly influencing a cell state.

In one example, certain operational calibration parameters can be determined at manufacture and stored in the memory 626 while other operational calibration parameters are to be determined at customer usage, for example a first off-the-shelf customer usage. The calibration parameters that are used in a first calibration cycle, for example for further optimization, can be retrieved either from the logic circuitry package's memory 626 of from a memory of the print apparatus. In one example, the memory 626 of the logic circuitry package 602 is read by the print apparatus by sending a request to the first address, and then the same calibration parameters are sent as part of a command to the logic circuit via the second or new communication address, for conditioning the output count values.

For example, at least one of a heat, offset, gain/amplifier, AD and DA parameter may be stored in the memory 626 for a certain class. For example, a plurality of operational calibration parameters ("OCP") 626-1 or a plurality of sets of operational calibration parameters may be stored in the memory 626 of the package 602, wherein each operational calibration parameter or set thereof is to be associated with a respective cell class. For example, the logic circuitry package 602 is configured to, using the stored at least one operational calibration parameter 626-1, output count values between the lowest and highest output count value of the output count value range. Note that the print apparatus logic circuit may use the stored operational calibration parameters 626-1 to start a further calibration cycle to determine better calibration parameters for usage during reading, for example calibration parameters that generate count values within a smaller sub-range at a certain distance from the highest or lowest output count values of the output range. In a further example, the memory 626 may store calibration parameters just to decrease a number of calibration cycles.

Figure 7:
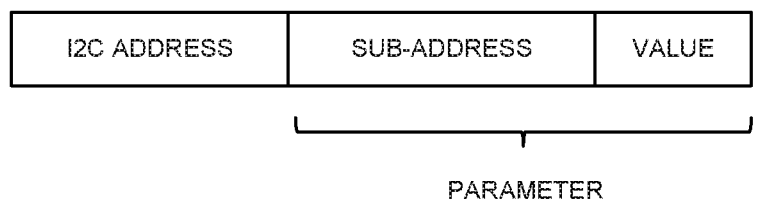
FIG. 7 illustrates an example of a command including a parameter.

As illustrated in FIG. 7, each command may be defined by a series of data frames including a parameter, wherein the command is configured for processing by the logic circuit 604 of various examples of this disclosure. The command of FIG. 7 illustrates three data frames. One data frame has encoded therein the I2C communication address, another data frame has encoded therein parameter function (here embodied by a sub-address such as a memory or register address) and another data frame has encoded therein the parameter value, whereby the function and value define the parameter. Acknowledge bits may be provided between data frames, for example for the logic circuit to identify the different data frames.

Each parameter may specify one or more functions and one or more corresponding values. In this example, the parameter function is defined by a sub-address (called "sub-address" to distinguish from the second and/or reconfigurable address of the logic circuit) such as a memory field address, for example a register address, for example to select an 8-bit memory field or register for writing the parameter value. The parameter function determines which logic function (class, sub-class, calibration) to address. The data frame of the function may consist of 8 bits. The data frame of the parameter value may consist of 8 bits, to write to the memory field. The sub-address of the parameter is called function in this disclosure because the sub-address determines the memory field and, in turn, the memory field selects a respective logic function (e.g., calibration function, sensor class selection function, sensor cell sub-class selection function) to be set to its stored parameter value. To illustrate this, a class parameter can include a class selection register address and a value to select the class that is identified by that value. Similarly, a sub-class selection parameter can include a sub-class selection register address and a sub-class number, for example to select the cell associated with the number. Aspects of registers and register addresses are also described with reference to FIG. 4A.

For example, a first command to the logic circuit specifies a new (e.g., reconfigured/temporary second) I2C communications address, a first calibration parameter function, and a calibration parameter value; a second command specifies a new I2C communications address, a second calibration parameter function, and a calibration parameter value; a third command specifies the new I2C communications address, a class parameter function, and a class parameter value; and a fourth command specifies the new I2C communications address, a sub-class parameter function, and a sub-class parameter value. This facilitates the logic circuit to select the appropriate class and sub-class and appropriately set the selected calibration functions. Note that the sequence of these commands may vary. In one example, any sequence may be applied because the corresponding logic functions will only be activated in response to a certain calibration parameter (e.g., offset and/or DA conversion) and/or a read request.

In one example, the parameter value data frame may include a set of used (or: to-be-used) bits and a set of not-used (or: not-to-be-used) bits, whereby the set of used bits define the parameter value. The set of used bits may include the least significant bit. The not-used bits in the same data frame are not used by the respective logic function and may include the most significant bit. For example, a class can be selected based on bit-combinations of only three first bits including the least significant bit, ignoring five remainder bits in the data frame including the most significant bit. A sub-class can be selected based on bit-combinations of only seven bits including the least significant bit, ignoring the most significant bit in the data frame.

A memory field of a single address may drive several logic functions. Correspondingly, different bits of the parameter value data frame may drive different logic functions. In such example, the parameter function and parameter value of a single command transaction may actually encompass several parameter functions and several parameter values, respectively.

Certain bits typically included in the command, such as start bits, stop bits, acknowledge bits and/or other bits, are omitted from FIG. 7. The command structure may follow an I2C communication protocol. A single complete transaction or command may include an I2C address (e.g., the second default or new address) and the parameter.

The logic circuit 604 may be adapted to identify each of these fields (I2C address, register address, value) and respond (or not) accordingly. For example, a stream of different commands, wherein each command includes a separate parameter, may be illustrated by a repetitive sequence of the command illustrated in FIG. 7. Each command, also called transaction, may include a start bit, an I2C address, a register address, a value, and a stop bit. Also, other (not named) bits may be included such as acknowledge bits and certain not-used bits.

It is again noted that in one example the logic circuit is configured to select sensors using the class, and where necessary, sub-class, parameters. In such example, the class and sub-class parameters are the sensor ID parameters. In an alternative example that uses fewer or no sensor cells, the sensor ID (class/sub-class) parameters are used to select or at least drive the responses, to satisfy the print apparatus logic circuit.

Figure 8:
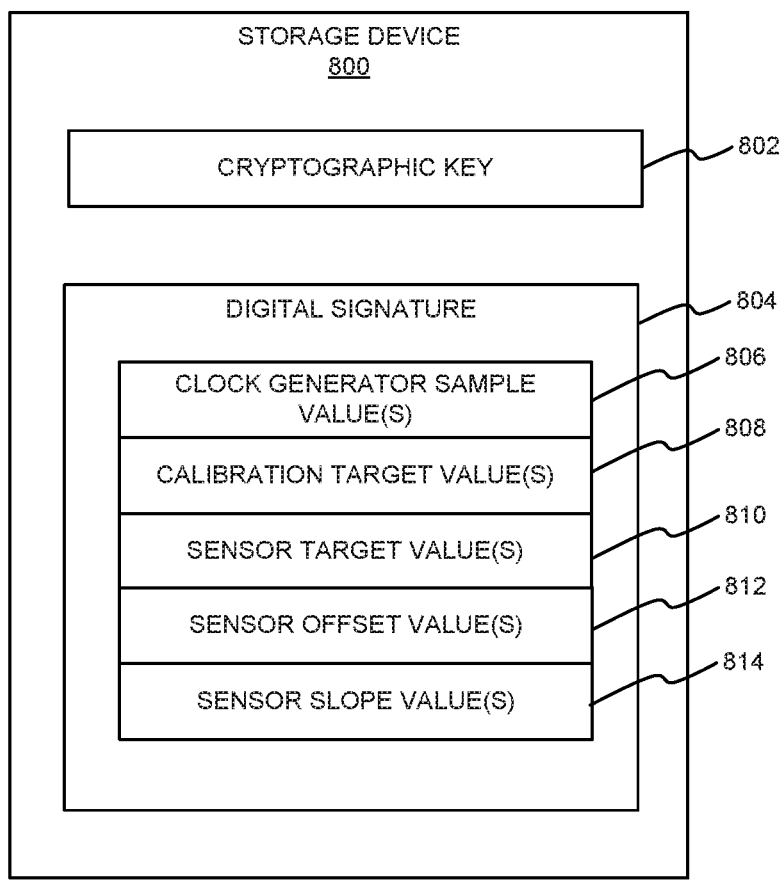
FIG. 8 illustrates one example of a memory of a logic circuitry package.

FIG. 8 illustrates one example of a memory 800 of a logic circuitry package, which may provide a part of memory 423a of logic circuitry package 400c (FIG. 4C), memory 426 of processing circuitry 424 (FIG. 4D), memory 432 of logic circuitry package 400d (FIG. 4E), or memory 626 of logic circuitry package 602 (FIG. 6). Memory 800 may store, in addition to other values previously described, a cryptographic key 802 and a digital signature 804 for operating a logic circuitry package. Digital signature 804 may include a single reference parameter, or as illustrated in FIG. 8, a plurality of reference parameters including clock generator sample value(s) 806, calibration target value(s) 808, sensor target value(s) 810, sensor offset value(s) 812, and sensor slope value(s) 814. In other examples, digital signature 804 may exclude some of the values illustrated or include additional values not illustrated.

The clock generator sample value(s) 806 may include digital value(s) (e.g., counts) corresponding to expected clock cycle counts of clock signals generated within the logic circuitry package relative to a reference clock. Calibration target value(s) 808 may include digital value(s) corresponding to expected calibration value(s) (e.g., offset values) after a sensor or sensors (e.g., ink level sensor, strain gauge) of the logic circuitry package have been calibrated via a calibration function (e.g., 616 of FIG. 6). Sensor target value(s) 810 may include digital value(s) corresponding to expected sensor reading(s) after a sensor or sensors (e.g., crack detector) of the logic circuitry package have been calibrated via a calibration function (e.g., to set gain and offset parameters).

Sensor offset value(s) 812 may include digital value(s) corresponding to expected senor offset(s) after a sensor or sensors (e.g., ink level sensor, strain gauge) of the logic circuitry package have been calibrated via a calibration function. Sensor slope value(s) 814 may include digital value(s) corresponding to expected senor slope(s) after a sensor or sensors (e.g., ink level sensor, strain gauge) of the logic circuitry package have been calibrated via a calibration function. In one example, a first sensor slope value and a first sensor offset value may be used to convert a temperature sensor reading into an absolute temperature of the logic circuitry package. In another example, a second sensor slope value may be used to verify the operation of sensors (e.g., strain gauges) used to detect a pneumatic actuation of the print apparatus component.

In one example, each of the values 806, 808, 810, 812, and 814 may be temperature corrected to a predetermined temperature (e.g., 20° C.). As described above, each reference parameter may be used to validate expected responses and/or behaviors of the logic circuitry package. A comparison of generated and/or measured values of the logic circuitry package to the reference parameters may be used to ensure the print apparatus component is operating as expected (i.e., the component is not defective), to validate the component, or for other suitable purposes.

Figure 9:
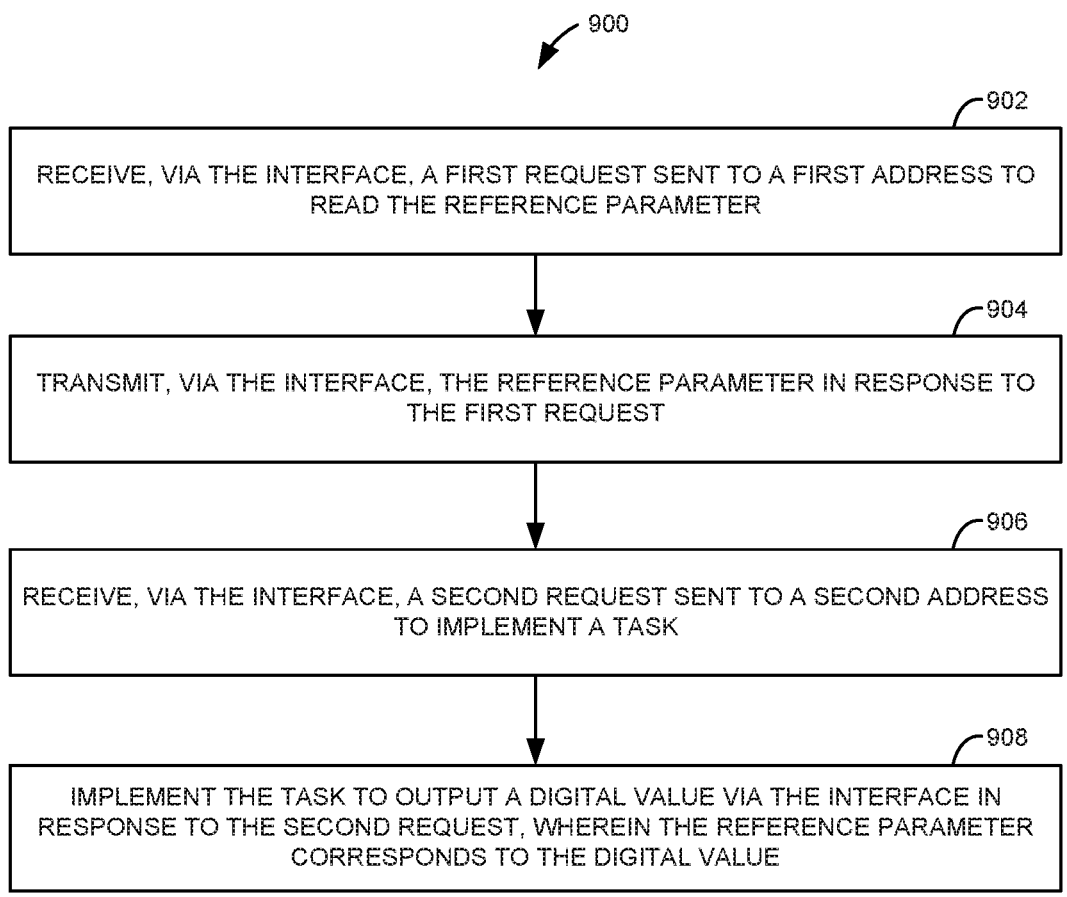
FIG. 9 is a flow diagram illustrating one example of a method that may be carried out by a logic circuitry package.

FIG. 9 is a flow diagram illustrating one example of a method 900 that may be carried out by a logic circuitry package, such as logic circuitry package 400a-400d or 602, or by processing circuitry 424. In this example, the at least one logic circuit of the logic circuitry package includes an interface (e.g., 428a and/or 428b of FIG. 4E or 606 of FIG. 6) to communicate with a print apparatus (e.g., 300 of FIG. 3) logic circuit and a memory (e.g., 800 of FIG. 8) storing a reference parameter (e.g., 806, 808, 810, 812, or 814). At 902, the at least one logic circuit may receive, via the interface, a first request sent to a first address to read the reference parameter. At 904, the at least one logic circuit may transmit, via the interface, the reference parameter in response to the first request. At 906, the at least one logic circuit may receive, via the interface, a second request sent to a second address to implement a task. At 908, the at least one logic circuit may implement the task to output a digital value via the interface in response to the second request. The reference parameter corresponds to the digital value. For example, the digital value may equal the reference parameter or be within a specified range (e.g., +/−1% to +/−10%) of the reference parameter.

The reference parameter may correspond to a predetermined temperature of the at least one logic circuit. For example, the reference parameter may correspond to the expected digital value at 20° C. or another suitable temperature of the at least one logic circuit. In one example, the digital value may be temperature corrected to the predetermined temperature based on the absolute (e.g., measured) temperature of the logic circuitry package prior to any comparison of the digital value to the reference parameter. In another example, the reference parameter may be temperature corrected to the absolute (e.g., measured) temperature of the logic circuitry package prior to any comparison of the digital value to the reference parameter.

In one example, the memory stores digitally signed data comprising the reference parameter (e.g., 804 of FIG. 8). The second address may be one of a default second address and a reconfigured second address. The task may include one of a calibration function, a clock signal sample function, a sensor read function, and a register read function as previously described. The reference parameter may include one of a clock generator sample value, a calibration target value, a sensor target value, a sensor offset value, and a sensor slope value as previously described.

In one example, the memory may store a plurality of different reference parameters. In this example, each reference parameter may correspond to a digital value output in response to implementing a corresponding task of the at least one logic circuit.

In another example, the memory may store a cryptographic key (e.g., 802 of FIG. 8) to cryptographically authenticate the reference parameter. In this example, the at least one logic circuit may transmit the reference parameter cryptographically authenticated using the key in response to a cryptographically authenticated first request sent to the first address. The at least one logic circuit may output the digital value corresponding to the reference parameter without cryptographically authenticating the digital value using the key.

Figure 10A:
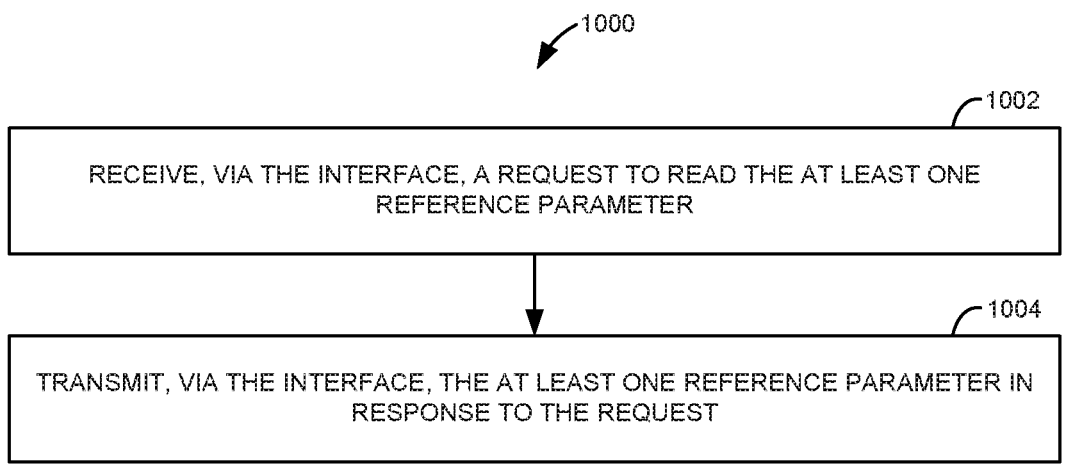
FIGS. 10A and 10B are flow diagrams illustrating another example of a method that may be carried out by a logic circuitry package.
Figure 10B:
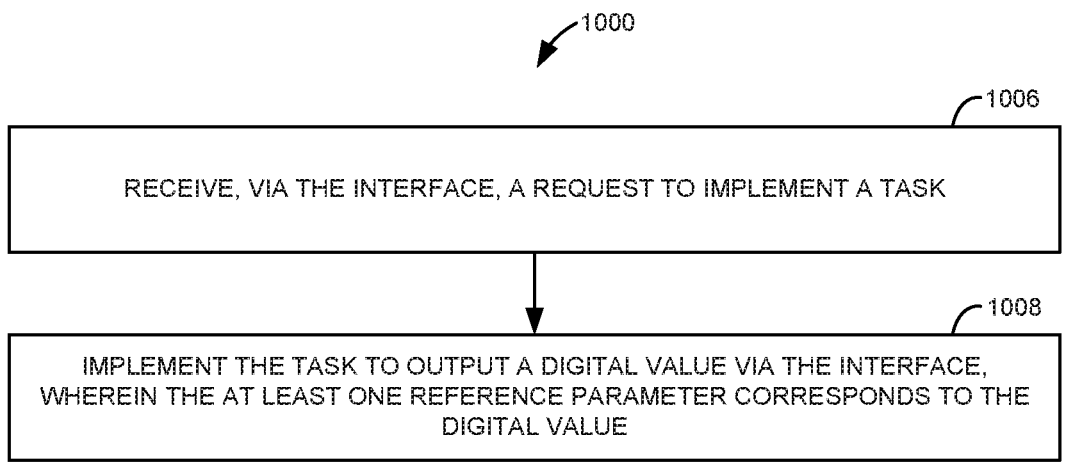

FIGS. 10A and 10B are flow diagrams illustrating another example of a method 1000 that may be carried out by a logic circuitry package, such as logic circuitry package 400a-400d or 602, or by processing circuitry 424. In this example, the logic circuitry package includes an interface (e.g., 428a and/or 428b of FIG. 4E or 606 of FIG. 6), a first logic circuit (e.g., 402a, 402b, 402c, 402d, or 402e of FIGS. 4A-4E) to respond to communications via the interface, and a second logic circuit (e.g., 406a, 406b, or 406c of FIGS. 4B, 4C, and 4E, respectively) to respond to communications via the interface. The first logic circuit includes a memory (e.g., 800 of FIG. 8) storing at least one reference parameter (e.g., 806, 808, 810, 812, or 814 of FIG. 8).

As illustrated in FIG. 10A, at 1002 the first logic circuit may receive, via the interface, a request to read the at least one reference parameter. At 1004, the first logic circuit may transmit, via the interface, the at least one reference parameter in response to the request. As illustrated in FIG. 10B, at 1006 the second logic circuit may receive, via the interface, a request to implement a task. At 1008, the second logic circuit may implement the task to output a digital value via the interface. The at least one reference parameter corresponds to the digital value. For example, the digital value may equal the reference parameter or be within a specified range (e.g., +/−1% to +/−10%) of the reference parameter.

The reference parameter may corresponds to a predetermined temperature of the second logic circuit. For example, the reference parameter may correspond to the expected digital value at 20° C. or another suitable temperature of the second logic circuit. In one example, the digital value may be temperature corrected to the predetermined temperature based on the absolute (e.g., measured) temperature of the second logic circuit prior to any comparison of the digital value to the reference parameter. In another example, the reference parameter may be temperature corrected to the absolute (e.g., measured) temperature of the second logic circuit prior to any comparison of the digital value to the reference parameter.

In one example, the memory stores digitally signed data comprising the at least one reference parameter (e.g., 804 of FIG. 8). The first logic may respond to communications sent to a first address, and the second logic circuit may respond to communications sent to a second address. The task may include one of a calibration function, a clock signal sample function, a sensor read function, and a register read function as previously described. The at least one reference parameter may include one of a clock generator sample value, a calibration target value, a sensor target value, a sensor offset value, and a sensor slope value as previously described.

In one example, the memory stores a plurality of different reference parameters. In this example, each reference parameter may correspond to a digital value output in response to implementing a corresponding task of the second logic circuit.

In another example, the memory stores a cryptographic key (e.g., 802 of FIG. 8) to cryptographically authenticate the at least one reference parameter. In this example, the first logic circuit may transmit the at least one reference parameter cryptographically authenticated using the key in response to a cryptographically authenticated request to read the at least one reference parameter sent to the first address. The second logic circuit may output the digital value corresponding to the at least one reference parameter without cryptographically authenticating the digital value using the key.

In another example, the memory (e.g., 626 of FIG. 6) of the first logic circuit stores a revision ID (e.g., 626-3). In this example, the second logic circuit may include a further memory (e.g., 628 of FIG. 6) storing a revision ID (e.g., 632). The revision ID stored in the memory of the first logic circuit matches the revision ID stored in the further memory of the second logic circuit. If the revision ID in the memory of the first logic circuit does not match the revision ID stored in the further memory of the second logic circuit, the logic circuitry package may have been improperly altered or damaged.

Figure 11:
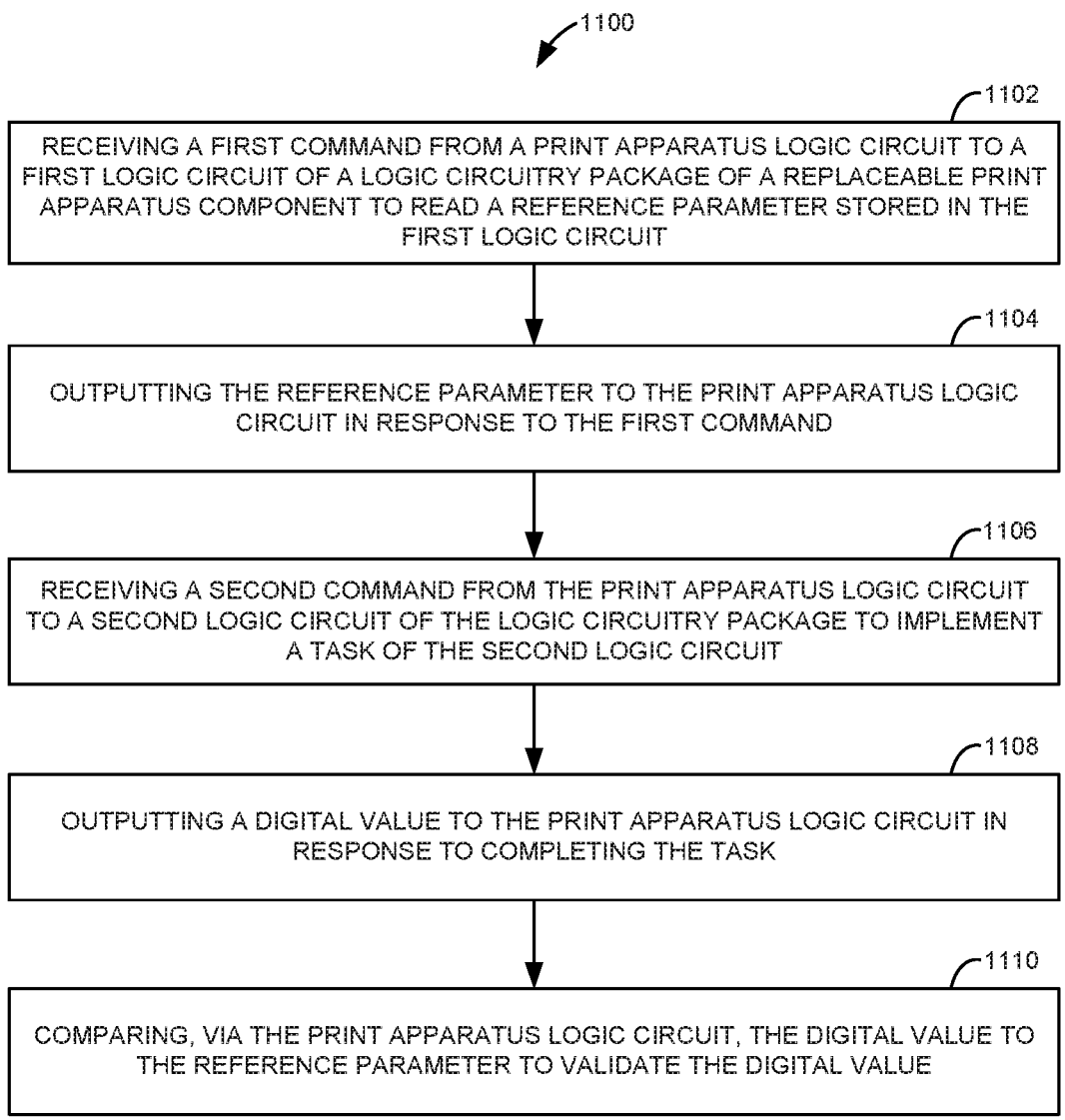
FIG. 11 is a flow diagram illustrating yet another example of a method that may be carried out by a logic circuitry package.

FIG. 11 is a flow diagram illustrating another example of a method 1100 that may be carried out by a logic circuitry package, such as logic circuitry package 400a-400d or 602, or by processing circuitry 424. At 1102, method 1100 may include receiving a first command from a print apparatus (e.g., 300 of FIG. 3) logic circuit to a first logic circuit (e.g., 402a, 402b, 402c, 402d, or 402e of FIGS. 4A-4E) of a logic circuitry package of a replaceable print apparatus component to read a reference parameter stored in the first logic circuit. At 1104, method 1100 may include outputting the reference parameter to the print apparatus logic circuit in response to the first command. At 1106, method 1100 may include receiving a second command from the print apparatus logic circuit to a second logic circuit (e.g., 406a, 406b, or 406c of FIGS. 4B, 4C, and 4E, respectively) of the logic circuitry package to implement a task of the second logic circuit. At 1108, method 1100 may include outputting a digital value to the print apparatus logic circuit in response to completing the task. At 1110, method 1100 may include comparing, via the print apparatus logic circuit, the digital value to the reference parameter to validate the digital value.

In one example, outputting the reference parameter includes outputting a digitally signed reference parameter. The first command may be sent to a first address of the first logic circuit, and the second command may be sent to a second address of the second logic circuit. The reference parameter may include one of a clock generator sample value, a calibration target value, a sensor target value, a sensor offset value, and a sensor slope value as previously described. The task may include one of a calibration function, a clock signal sample function, a sensor read function, and a register read function as previously described.

Figure 12:
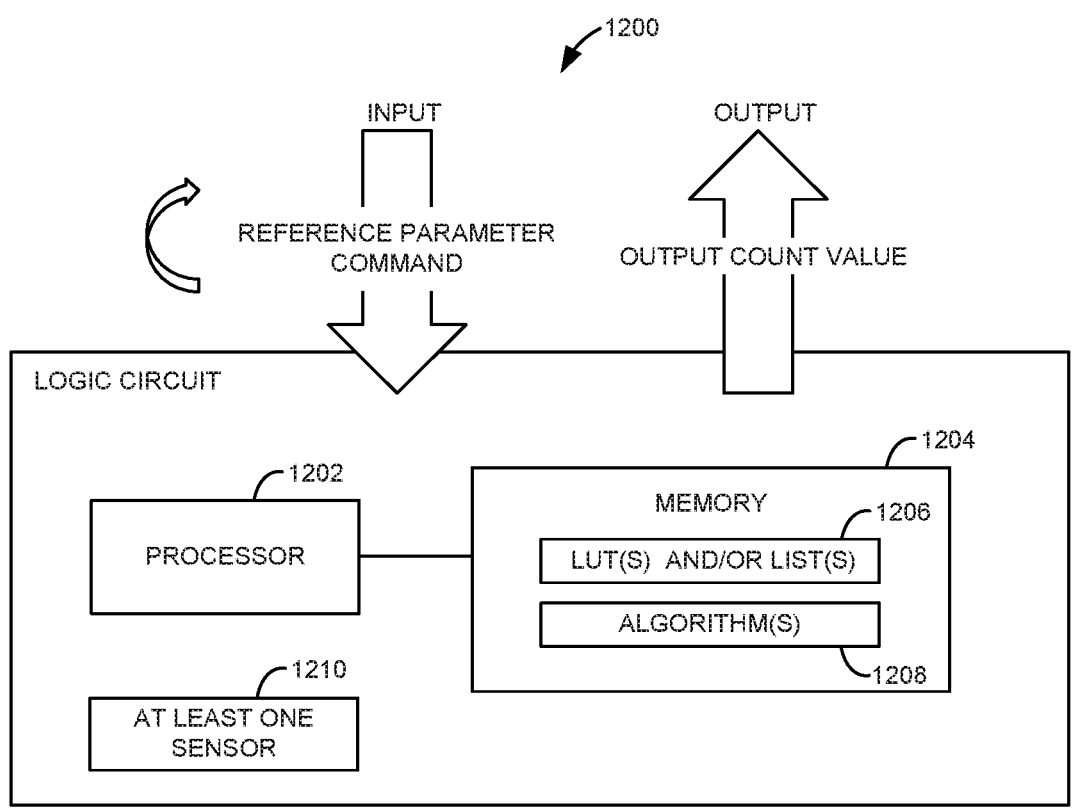
FIG. 12 illustrates another example of a logic circuitry package.

FIG. 12 illustrates another example of a logic circuitry package 1200. FIG. 12 illustrates how the logic circuitry package 1200 may generate a digital output (e.g., output count value) based on inputs including reference parameters and commands sent digitally by the print apparatus. Logic circuitry package 1200 includes a logic circuit with a processor 1202 communicatively coupled to a memory 1204. Memory 1204 may store look up table(s) and/or list(s) 1206 and/or algorithm(s) 1208. Logic circuitry package 1200 may also include any of the features of logic circuitry packages 400a-400d or 602 or processing circuitry 424 as previously described.

For example, the logic circuitry package 1200 may include at least one sensor 1210, or multiple sensors of different types. The logic circuit may be configured to consult a respective sensor 1210, in combination with the LUT(s)/list(s) 1206 and/or algorithm(s) 1208, based on the reference parameters and commands to generate the digital output. The at least one sensor 1210 may include a sensor to detect an ink level within a print material reservoir of a replaceable print component, and/or a sensor to detect an approximate temperature, and/or other sensors. The logic circuitry package 1200 may include a plurality of sensors of different types, for example, at least two sensors of different types, wherein the logic circuit may be configured to select and consult one of the sensors based on the sensor ID, and output a digital value based on a signal of the selected sensor.

Different sets of all the parameters are related to the different output count values as already explained above. The output count values may be generated using the LUT(s) and or list(s) 1206 and/or algorithm(s) 1208 whereby the parameters may be used as input. In addition, a signal of at least one sensor 1210 may be consulted as input for the LUT. In this case, the output count values may be digitally generated, rather than obtained from analog sensor measurements. For example, logic circuitry package 1200 may implement method 900 of FIG. 9, method 1000 of FIGS. 10A-10B, and/or method 1100 of FIG. 11 without converting any actual sensor measurements. In another example, analog sensor measurements may be used to thereafter digitally generate the output count value, not necessarily directly converted, but rather, using a LUT, list or algorithm, whereby the sensor signal is used to choose a portion or function of the LUT, list or algorithm. The example logic circuitry package 1200 may be used as an alternative to the complex thin film sensor arrays addressed elsewhere in this disclosure. The example logic circuitry package 1200 may be configured to generate outputs that are validated by the same print apparatus logic circuit designed to be compatible with the complex sensor array packages. The alternative package 1200 may be cheaper or simpler to manufacture, or simply be used as an alternative to the earlier mentioned packages, for example to facilitate printing and validation by the print apparatus.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, that communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request. In other examples, output may be generated without a read request.

Each of the logic circuitry packages 400a-400d, 602, 1200 described herein may have any feature of any other logic circuitry packages 400a-400d, 602, 1200 described herein or of the processing circuitry 424. Any logic circuitry packages 400a-400d, 602, 1200 or the processing circuitry 424 may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfill the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a replaceable print apparatus component comprising an interface to communicate with a print apparatus logic circuit, and at least one logic circuit comprising:
 a memory storing a reference parameter;
 a controller; and
 a machine readable storage medium storing instructions that when executed by the controller cause the at least one logic circuit to:
  receive, via the interface, a first request sent to a first address to read the reference parameter;
  transmit, via the interface, the reference parameter in response to the first request;
  receive, via the interface, a second request sent to a second address to implement a task; and
  implement the task to output a digital value via the interface in response to the second request,
  wherein the reference parameter corresponds to the digital value, and
  wherein the memory stores digitally signed data comprising the reference parameter.

2. The logic circuitry package of claim 1, wherein the second address is one of a default second address and a reconfigured second address.

3. The logic circuitry package of claim 1, wherein the reference parameter comprises one of a clock generator sample value, a calibration target value, a sensor target value, a sensor offset value, and a sensor slope value.

4. The logic circuitry package of claim 1, wherein the memory stores a plurality of different reference parameters, and
 wherein each reference parameter corresponds to a digital value output in response to implementing a corresponding task of the at least one logic circuit.

5. The logic circuitry package of claim 1, wherein the memory stores a cryptographic key to cryptographically authenticate the reference parameter, and
 wherein the machine readable storage medium stores instructions that when executed by the controller cause the at least one logic circuit to transmit the reference parameter cryptographically authenticated using the key in response to a cryptographically authenticated first request sent to the first address.

6. The logic circuitry package of claim 5, wherein the machine readable storage medium stores instructions that when executed by the controller cause the at least one logic circuit to output the digital value corresponding to the reference parameter without cryptographically authenticating the digital value using the key.

7. The logic circuitry package of claim 1, wherein the reference parameter corresponds to a predetermined temperature of the at least one logic circuit.

8. A replaceable print apparatus component comprising the logic circuitry package of claim 1, further comprising:
 a housing having a height, a width less than the height, and a length greater than the height, the height parallel to a vertical reference axis, and the width extending between two sides;
 a print liquid reservoir within the housing; and
 a print liquid output.

9. A logic circuitry package for a replaceable print apparatus component comprising an interface to communicate with a print apparatus logic circuit, and at least one logic circuit comprising:
 a sensor;
 a memory storing a reference parameter, the memory comprising at least one register;
 a controller; and
 a machine readable storage medium storing instructions that when executed by the controller cause the at least one logic circuit to:
  receive, via the interface, a first request sent to a first address to read the reference parameter;
  transmit, via the interface, the reference parameter in response to the first request;
  receive, via the interface, a second request sent to a second address to implement a task; and
  implement the task to output a digital value via the interface in response to the second request,
  wherein the reference parameter corresponds to the digital value, and
  wherein the task comprises one of a calibration function, a clock signal sample function, a sensor read function, and a register read function.

10. The logic circuitry package of claim 9, wherein the second address is one of a default second address and a reconfigured second address.

11. The logic circuitry package of claim 9, wherein the reference parameter comprises one of a clock generator sample value, a calibration target value, a sensor target value, a sensor offset value, and a sensor slope value.

12. The logic circuitry package of claim 9, wherein the memory stores a plurality of different reference parameters, and
 wherein each reference parameter corresponds to a digital value output in response to implementing a corresponding task of the at least one logic circuit.

13. The logic circuitry package of claim 9, wherein the memory stores a cryptographic key to cryptographically authenticate the reference parameter, and wherein the machine readable storage medium stores instructions that when executed by the controller cause the at least one logic circuit to transmit the reference parameter cryptographically authenticated using the key in response to a cryptographically authenticated first request sent to the first address.

14. The logic circuitry package of claim 13, wherein the machine readable storage medium stores instructions that when executed by the controller cause the at least one logic circuit to output the digital value corresponding to the reference parameter without cryptographically authenticating the digital value using the key.

15. The logic circuitry package of claim 9, wherein the reference parameter corresponds to a predetermined temperature of the at least one logic circuit.

16. A replaceable print apparatus component comprising the logic circuitry package of claim 9, further comprising:
   a housing having a height, a width less than the height, and a length greater than the height, the height parallel to a vertical reference axis, and the width extending between two sides;
   a print liquid reservoir within the housing; and
   a print liquid output.

17. A logic circuitry package for a replaceable print apparatus component, the logic circuitry package comprising:
   an interface;
   a first logic circuit configured to respond to communications via the interface, the first logic circuit comprising a memory storing at least one reference parameter, and the first logic circuit configured to:
      receive, via the interface, a request to read the at least one reference parameter; and
      transmit, via the interface, the at least one reference parameter in response to the request;
   a second logic circuit configured to respond to communications via the interface, the second logic circuit configured to:
      receive, via the interface, a request to implement a task; and
      implement the task to output a digital value via the interface;
   wherein the at least one reference parameter corresponds to the digital value.

18. The logic circuitry package of claim 17, wherein the memory stores digitally signed data comprising the at least one reference parameter.

19. The logic circuitry package of claim 17, wherein the first logic circuit is configured to respond to communications sent to a first address, and wherein the second logic circuit is configured to respond to communications sent to a second address.

20. The logic circuitry package of claim 19, wherein the memory stores a cryptographic key to cryptographically authenticate the at least one reference parameter, and wherein the first logic circuit is configured to transmit the at least one reference parameter cryptographically authenticated using the key in response to a cryptographically authenticated request to read the at least one reference parameter sent to the first address.

21. The logic circuitry package of claim 20, wherein the second logic circuit is configured to output the digital value corresponding to the at least one reference parameter without cryptographically authenticating the digital value using the key.

22. The logic circuitry package of claim 17, wherein the task comprises one of a calibration function, a clock signal sample function, a sensor read function, and a register read function.

23. The logic circuitry package of claim 17, wherein the at least one reference parameter comprises one of a clock generator sample value, a calibration target value, a sensor target value, a sensor offset value, and a sensor slope value.

24. The logic circuitry package of claim 17 wherein the memory stores a plurality of different reference parameters, and wherein the second logic circuit is configured such that each reference parameter corresponds to a digital value output in response to implementing a corresponding task of the second logic circuit.

25. The logic circuitry package of claim 17, wherein the reference parameter corresponds to a predetermined temperature of the second logic circuit.

26. The logic circuitry package of claim 17, wherein the memory of the first logic circuit stores a revision ID, wherein the second logic circuit comprises a further memory storing a revision ID, and wherein the revision ID stored in the memory of the first logic circuit matches the revision ID stored in the further memory of the second logic circuit.

* * * * *